(12) United States Patent
Holenstein et al.

(10) Patent No.: US 7,321,904 B2
(45) Date of Patent: Jan. 22, 2008

(54) SYNCHRONIZATION OF A TARGET DATABASE WITH A SOURCE DATABASE DURING DATABASE REPLICATION

(75) Inventors: Paul J. Holenstein, Downingtown, PA (US); Bruce D. Holenstein, Media, PA (US); Gary E. Strickler, Pottstown, PA (US)

(73) Assignee: Gravic, Inc., Malvern, PA (US)

( * ) Notice: Subject to any disclaimer, the term of this patent is extended or adjusted under 35 U.S.C. 154(b) by 497 days.

(21) Appl. No.: 10/853,086

(22) Filed: May 25, 2004

(65) Prior Publication Data
US 2004/0215670 A1   Oct. 28, 2004

Related U.S. Application Data

(63) Continuation of application No. 09/930,641, filed on Aug. 15, 2001, now Pat. No. 6,745,209.

(51) Int. Cl.
*G06F 17/30* (2006.01)

(52) U.S. Cl. .................. 707/201; 707/200; 707/202

(58) Field of Classification Search ............. 707/1–10, 707/100, 101, 200–205
See application file for complete search history.

(56) References Cited

U.S. PATENT DOCUMENTS

| | | | |
|---|---|---|---|
| 5,737,601 A * | 4/1998 | Jain et al. ................ 707/201 |
| 5,745,753 A | 4/1998 | Mosher, Jr. | |
| 5,765,171 A | 6/1998 | Gehani et al. | |
| 5,884,328 A | 3/1999 | Mosher, Jr. | |
| 5,974,574 A | 10/1999 | Lennie et al. | |
| 6,122,630 A | 9/2000 | Strickler et al. | |
| 6,408,310 B1 | 6/2002 | Hart | |
| 6,430,577 B1 * | 8/2002 | Hart ........................ 707/201 |
| 6,993,539 B2 * | 1/2006 | Federwisch et al. ....... 707/201 |
| 7,072,911 B1 * | 7/2006 | Doman et al. ............. 707/201 |
| 7,203,687 B2 * | 4/2007 | Adiba et al. .............. 707/100 |

FOREIGN PATENT DOCUMENTS

| WO | WO 00/64124 A1 | 10/2000 |
| WO | WO 01/37092 A1 | 5/2001 |

OTHER PUBLICATIONS

Oracle SQL Loader FAQ, printout from web site: http://www.orafaq.org/faqloadr.htm, printout date: Jun. 1, 2001, article date: Jan. 23, 2001, 6 pages.

Using the Oracle Bulk Loader, printout from web site: http://www-db.stanford.edu/~ullman/fcdb/oracle/or-load.html, printout date: Jun. 1, 2001, article date: 1997-1999, 4 pages.

(Continued)

*Primary Examiner*—Don Wong
*Assistant Examiner*—Marcin Filipczyk
(74) *Attorney, Agent, or Firm*—Akin Gump Strauss Hauer & Feld LLP

(57) ABSTRACT

A target database is synchronized with a source database in a database replication system. Key ranges of blocks of data to be replicated are used in the replication process. Also, synchronization occurs simultaneously with replication.

28 Claims, 5 Drawing Sheets

OTHER PUBLICATIONS

Solutions to Common SQL LOADER Questions, printout from web site: http://www.fors.com/orasupp/rdbms/utils/140121_1.htm, printout date: Jun. 1, 2001, article date: Feb. 1995, 5 pages.

Robert K. Lockhart et al. Specifications for Ir Mobile Communications (IrMC), ver. 1.1, Mar. 1999.

Partial European Search Report for EP 02017282, mail date: Feb. 13, 2006, 4 pages.

* cited by examiner

SYNCHRONIZATION OF A TARGET DATABASE WITH A SOURCE DATABASE DURING DATABASE REPLICATION

CROSS-REFERENCE TO RELATED APPLICATIONS

This application is a continuation of U.S. application Ser. No. 09/930,641 filed Aug. 15, 2001 entitled "SYNCHRONIZATION OF PLURAL DATABASES IN A DATABASE REPLICATION SYSTEM," now U.S. Pat. No. 6,745,209, the entire disclosure of which is incorporated herein by reference.

BACKGROUND OF THE INVENTION

The present invention relates to the field of data replication.

"Database Replication" is specified as the application of database deltas (i.e., the results of transactions being performed against a database) from one database in a pair to the other one. Transaction I/O (e.g., inserts, updates, and deletes) applied to one database are applied to the other database, and vice-versa (for the case of bisectional database replication). Both databases are "live" and are receiving transactions from applications and/or end users. U.S. Pat. No. 6,122,630 (Strickler et al.), which is incorporated by reference herein, discloses a bisectional database replication scheme for controlling transaction ping-ponging.

"Loading" a target database consists of taking a copy or subset of the source database information, optionally transforming or filtering it, and saving it into a target database. The goal of the loading process is for the source and target databases, or the subset of the data in the databases, to be synchronized (i.e., to match based on the range and transformation/filter logic) at the end of the operation.

"Offline" loading is defined as loading a target database when the source and target are offline, i.e., not accessible to applications. Many loading techniques are available for this form of loading, such as:

(1) Database backup and restore (using disk, tape, etc).

(2) Direct data file duplication and copying (e.g., using a disk utility to copy the file structure and/or contents from the source to the target, such as FUP DUP on a Compaq NSK system).

(3) FTP, etc.

Sometimes, these same offline techniques can be used if the source and/or target database are accessible to applications for read-only purposes. In some cases, these techniques (such as a FUP COPY SHARE option on a Compaq NSK system) can even be used if the source or target is open for update by applications, although the efficiency of the operation typically degrades.

Approaches to offline loading typically leverage the non-concurrent aspects of using "bulk" methods for the extract and/or apply phases, and the target is usually unavailable to applications during the sequence. Additionally, for those approaches that allow the source and/or target to be accessible to applications during the operation, the offline approaches do not resolve and include any updates that are occurring during the operation into the target.

"On-line" loading is defined as the ability to perform loading of a target database when either the source or target database, or both, are being actively accessed by applications (on-line transaction processing (OLTP), batch, etc.). Loading can be of the entire target, a subset of a target, or checking and resynchronizing a key range in the target.

There are several types of on-line loading—loading when the source or target is offline (i.e., inaccessible to applications), loading when the source and/or target is on-line for read-only application access, loading when the source and/or or target is on-line for full update application access, or any combination of the above with some form of concurrent application access to either or both databases.

Shadowbase™ (a commercially available product made by ITI, Inc., Paoli, Pa.) allows for on-line (that is, application level) access to the source and target databases when both the application and replication are active. Older schemes, including ITI's TMF Auditor and Migrator products, and U.S. Pat. No. 5,884,328 (Mosher, Jr.) disclose schemes for loading an active source to an inactive target. Loading an inactive target typically allows for a significantly different approach using more bulk-oriented methods (the classic concurrency vs. speed tradeoff).

Some desirable and important goals of on-line loading are summarized below:

(1) Design solutions should transcend the platforms, environments, and databases, i.e., solutions should work on both the NSK platform and on the 'open' sides (e.g., Unix, NT, VMS, etc), and any combination thereof (NSK–>NSK, NSK–>Open, Open–>NSK, Open–>Open, etc).

(2) Design solutions should work on both "audited" and "non-audited" databases. Audited databases support transactional integrity. That is, a set of I/O operations is either fully committed, or fully backed out, based on the success or failure of the transaction. Audited databases typically provide a transaction "redo" log that can often be read by the replication engine for transaction I/O order. The collection of the I/O's in a non-audited database must be managed and made available to the replication engine (see discussion below).

(3) Design solutions should transcend the database types, whether legacy (e.g., Compaq Enscribe), relational (e.g., SQL), hierarchical (e.g., VSAM/ISAM), network, or other. Throughout this disclosure, file/record/field and table/row/column are used interchangeably.

(4) The design solutions should allow for on-line loading, e.g., via Shadowbase technology, properly sequenced with OLTP transactions against the file. That is, at every point in time, the target should be properly synchronized with the source for the data ranges that have been already loaded. Some of the schemes described in the present invention may violate this constraint for brief periods during loading (i.e., referential integrity may be briefly violated). More specifically, when using certain designs that do not lock the source data (i.e., BROWSE access that reads "dirty" data), and those that only briefly lock the source data intra-record (i.e., STABLE access that only holds a lock for the time the read takes to complete), violating referential integrity is a transient problem in the target only until all transactions that were active when the block that was loaded have terminated, or until the replication stream catches up to the point where the intra-record lock occurred.

(5) Generation of audit/log file data should be minimized for the data being loaded. That is, the data being loaded should not require intermediate storage (e.g., in an audit trail or transaction log file). Instead, the data should flow directly to the target table, possibly via some intermediate replication engine processes or functions.

(6) The design solutions should not require "audit compression" or a similar feature to be turned off or disabled (i.e., do not require that audit data compression be turned off for audit trail data). Audit compression is a technique for saving just those field or record components that actually changed. Audit compression is thus a desirable feature to keep on because it minimizes the amount of data saved in the audit trail.

(7) The design solutions should allow loading of the target to be done in parallel, only loosely coupled with the on-line updates (i.e., multiple loading threads can be run in parallel, and these are only recombined with on-line updates when necessary).

(8) For those replication environments that implement filtering and/or data transformations to the data being replicated, the design solutions should only require one set of user exits/mapping configuration, meaning the loading path uses the same user exits/maps as the on-line path. Depending on the approach, these same user exits/maps may be bound into multiple replication components.

(9) The data should be able to be loaded the 'correct' way the first time, meaning as an insert when it should be an insert (rather than an update that fails and is mapped into an insert). This should decrease loading overhead somewhat.

(10) The design solutions should be extremely fast and efficient, approaching 'raw' or bulk loading rates when the source and/or target is offline, or when the target database supports a bulk-style insert operation even when the target is on-line. This is especially true for schemes that use APPEND-type bulk insert operations.

(11) The design solutions should allow the user to select the data range(s) to be loaded, and should be fully restartable.

Accordingly, there is an unmet need for a synchronization scheme in a database replication system that does not suffer from the negative aspects discussed above, and which is fast, relatively simple to implement, and efficiently uses communication medium. The present invention fulfills such a need.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings.

BRIEF SUMMARY OF THE INVENTION

Figure 1:
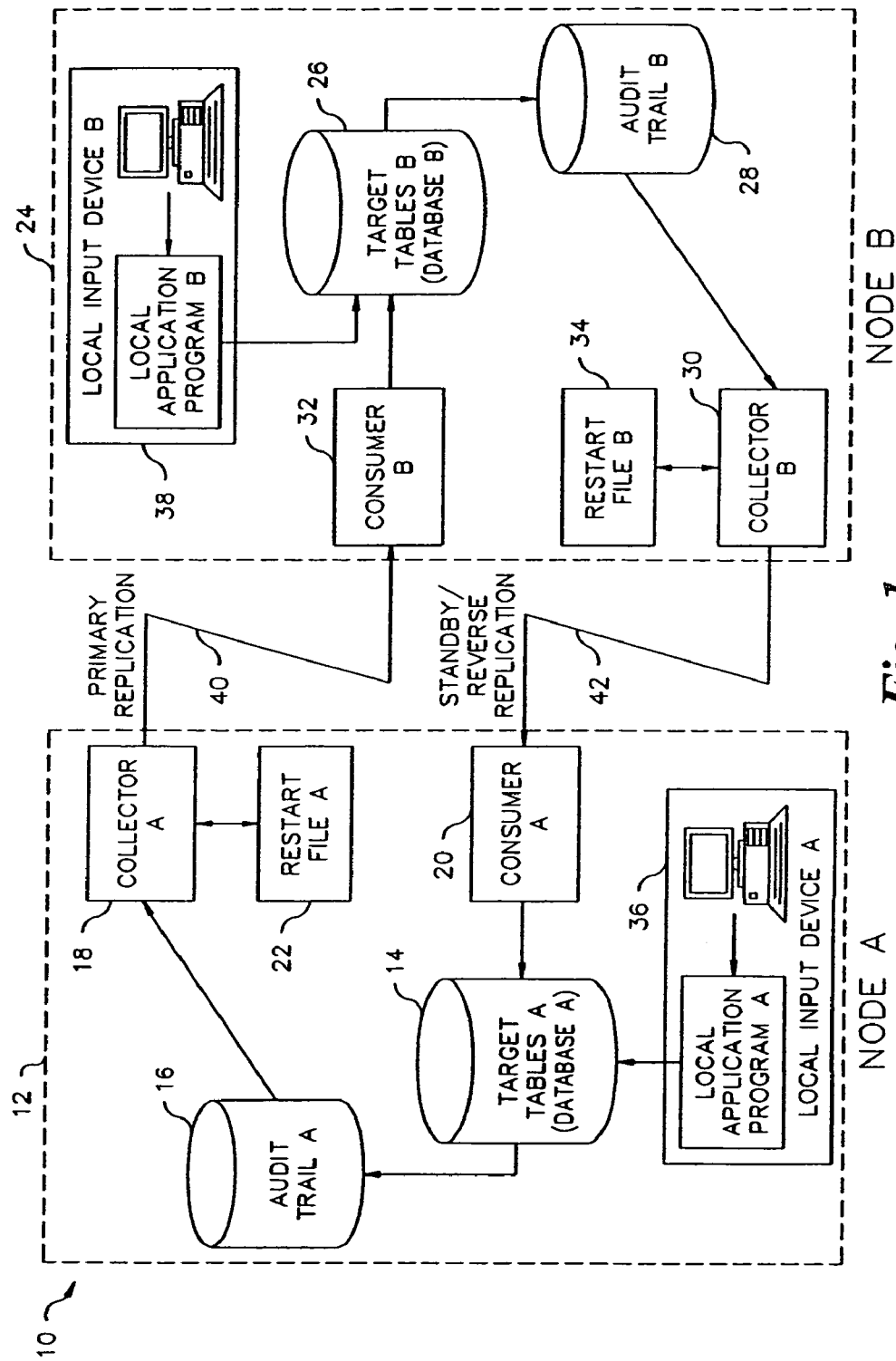
FIG. 1 is a schematic block diagram of a prior art bisectional database replication system.

Plural databases are synchronized in a database replication system that includes a plurality of nodes connected via communication media in a topology. Each node includes a database, an audit trail of all transactions posted to the database, and a transaction transmitter which sends selected transactions in the audit trail to one or more other nodes. In the synchronization process, a block of data is read from a source database at the first node. A marker is assigned to the block of data, and the marker is then written to the audit trail at the first node. The transaction transmitter at the first node sends the marker in the audit trail to a second node having a target database. The block of data is sent from the first node to the second node without passing the block of data through the audit trail. At the second node, the block of data is stored in the target database upon receipt at the second node of the block of data and the marker assigned to the block of data. This process is repeated for additional blocks of data in the source database, wherein a marker is assigned to each subsequent block of data. In this manner, some or all of the source database may be replicated to the target database without having to store or pass any data in the source database in or through the audit trail at the first node.

DETAILED DESCRIPTION OF THE INVENTION

Certain terminology is used herein for convenience only and is not to be taken as a limitation on the present invention. In the drawings, the same reference letters are employed for designating the same elements throughout the several figures.

Definitions

The following definitions are provided to promote understanding of the invention. For clarity, the definitions are phrased with respect to a scheme that replicates only two databases. However, the scope of the invention includes schemes where replication occurs between more than two databases.

Replication—duplicating the contents of at least a portion of data records held in a source database to a target database. In the narrowest sense, replication involves duplicating the entire contents and format of the data records so that the two databases are totally identical, and thus interchangeable with each other. In the broadest sense, replication as defined herein involves duplicating at least the contents of a portion of the data records, and not necessarily duplicating the format of the data records. Replication thus may involve data transformation or filtering wherein the source data is altered in some manner before being applied to the target database. The concept of replication vs. transformation of data is discussed in more detail below.

Replication Data—includes both "absolute" database information (e.g., set the price field to a certain value), as well as "relative" database information (e.g., add $10 or 10% to the price field).

Collector (COLL)—an object or process that reads an audit trail or other transaction log file of a first database, extracts information about specified changes to the first database (e.g., insertions, updates, deletions), and passes that information to the consumer object or process defined below. In Shadowbase™ executing on a COMPAQ NSK (Tandem) source, the collector reads TMF or TM/MP audit trails. In a bisectional database replication scheme, each of the two databases has an associated collector. The extractor process shown in FIG. 1 of U.S. Pat. No. 5,745,753 (Mosher, Jr.) assigned to Tandem Computers, Inc is similar in operation to the collector.

Transaction Transmitter—device or object which sends transactions posted to one database to the other database for replication in the other database. In one embodiment of the present invention, the transaction transmitter is identical to the collector. In other embodiments, the transaction transmitter performs some, but not all, of the functions of the collector. In a bisectional database replication scheme, each of the two databases has an associated transaction transmitter.

Consumer (CONS)—an object or process that takes messages about database changes that are passed by the collector object or process and applies those changes to the second database. In a bisectional database replication scheme, each of the two databases has an associated consumer. The receiver process shown in FIG. 1 of Tandem's U.S. Pat. No. 5,745,753 is similar in concept to the consumer, except that the consumer described herein can process multi-threaded (i.e., overlapping) transactions, whereas the receiver process in the Tandem patent cannot process multi-threaded transactions.

Transaction Receiver—device or object which receives transactions sent by a transaction transmitter for posting to a database. In one embodiment of the present invention, the transaction receiver is identical to the consumer. In other embodiments, the transaction receiver performs some, but not all, of the functions of the consumer. In a bisectional database replication scheme, each of the two databases has an associated transaction receiver.

Database—in the broadest sense, a database as defined herein comprises at least one table or file of data, or a portion of a table or file of data wherein the data is typically arranged in records called rows. In a narrower sense, a database is also a collection of tables or files, that is, multiple tables or files make up a database. Replication among databases thus has different meanings depending upon how the database is defined. Consider the following examples:

1. A system includes a single database which has two tables or files (i.e., two sub-databases) and the database replicates to itself. Replication thus maintains the two tables or files in the same state. The tables or files are in the same physical location, and each has a respective audit trail, collector and consumer.

2. A system includes a single database which has one table or file partitioned into two parts and the database replicates to itself. The first part has a plurality of records, and the second part has a plurality of records which must be kept in the same state as the first plurality of records. Replication thus maintains the two parts of the table or file in the same state. The two parts of the table or file are in the same physical location, and each has a respective audit trail, collector and consumer.

3. A system includes two databases, each located remotely from the other. Each database may have one or more tables or files, and the two remotely located databases replicate themselves. Replication thus maintains the two databases (including all of their respective tables or files) in the same state. The two databases are in different physical locations, and each has a respective audit trail, collector and consumer. In a typical scenario, each database resides at a different node within a network.

Table—alternative name for a database. In the preferred embodiment of the present invention, replication and copying of data is performed at the file level. However, other levels of replication/copying are within the scope of the invention, such as diskcopy-type operations which are used to create the databases 126 in FIG. 1 of Tandem's U.S. Pat. No. 5,745,753.

Primary Replication—effectively, unidirectional replication from a first database to a second database.

Row—effectively, a single record out of a database. A row update is an individual step defined to mean a modification (e.g., insert, update, delete) to the database.

Reverse Replication—effectively, unidirectional replication from the second database to the first database.

Transaction—A transaction is a unit of work consisting of one or more individual steps and/or operations to be applied to one or more local and/or remote databases as a single atomic unit of work. A characteristic of transactions is the requirement that either all steps and/or operations are applied or all are rolled back in the case of a problem so that the database(s) is always left in a consistent state. Transactions are often identified by a number or name called the transaction identifier. The transaction identifier is often, though not necessarily, unique. An example of an "individual step" would be to insert a record (row) into the database. An example of an "operation" would be the procedure which increases the price column of all rows in the database by 10%.

In an unaudited (non-transactional) database, each step or operation will be treated as a separate transactional unit of work. The commit step is akin to unlocking the column, row, page or table.

Audit trail (ADT)—An audit trail is akin to an application, system, replication, or other suitable log, disk cache, or change data file or storage medium.

Filtering—The operation of selectively choosing rows or transactions to replicate.

Restart—the steps that need to be taken in the event that one or more of the primary or secondary replication component(s) is unavailable and a restoration of the failed replication component(s) is needed. For example, if a communication channel fails, then any messages that were lost in transit need to be resent during the restart. The restart might be partial, (i.e., just certain or failed components get restarted), or total (i.e., all replication components are stopped and restarted). In either case, a non-transient source of information is needed to effectuate the restart, for instance, to tell the collectors where in the audit trail to start reading for transaction data. A restart file is often used for this purpose. In normal operation, the replication components periodically, or at certain events, log their current position to the restart file so that it can be used when a restart is needed. Some desirable aspects of effective restarts include: (1) no or few and non-complex system operator steps needed to effectuate the restart, (2) prevention of duplicate database updates from being applied to the target database, (3) restoration or elimination of missing database updates, and (4) minimal restart time.

Data Transformation—The scope of the present invention also includes schemes which perform transformation of data, instead of strict replication. Examples of transformations include:

1. Replicating Enscribe source data to SQL target tables.
2. Eliminating or adding columns or rows in a target.
3. Combining records from two source files or tables and writing them into one target file or table.
4. Changing the type, structure or length of a field.
5. Taking one source record and writing one target record for each occurrence of a particular field (e.g., data normalization).
6. Writing a source record to a target only when a field contains a specific value (conditional replication).

Additional definitions are provided below in the Detailed Disclosure portion of the present specification.

In the examples of the present invention described below, the first and second transaction transmitters are first and second collectors, the first and second transaction receivers are first and second consumers, and the first and second databases are first and second target tables. Also, the examples below presume that strict database replication occurs without any transformation of the contents of the data or its format. However, the scope of the invention includes bisectional replication schemes wherein at least the contents of a portion of the data or its format are transformed.

FIG. 1 is a diagram of the infrastructure for a prior art bisectional replication system 10 illustrated and described in U.S. Pat. No. 6,122,630. In this diagram, the two databases or target tables which must be kept in the same state are located remotely from each other at different nodes in a network. However, as discussed above, the two databases may be in the same physical state and may even represent the same database replicating to itself. Thus, the communication lines shown in FIG. 1 may be merely internal data flow paths within a single computer memory, such as a bus line.

Referring to FIG. 1, the system 10 has a first node 12 comprising a first target table 14, a first audit trail 16, a first collector 18, a first consumer 20 and a restart file 22. The system 10 also has a second node 24 comprising a second target table 26, a second audit trail 28, a second collector 30, a second consumer 32 and a restart file 34. To simplify the explanation of the invention, the following terminology is used interchangeably:

first node 12—node A
first target table 14—target table A or database A
first audit trail 16—audit trail A
first collector 18—collector A
first consumer 20—consumer A
restart file 22—restart file A
second node 24—node B
second target table 26—target table B or database B
second audit trail 28—audit trail B
second collector 30—collector B
second consumer 32—consumer B
restart file 34—restart file B
combination of collector A and consumer B—primary replication subsystem
combination of collector B and consumer A—standby/reverse replication subsystem In addition to the elements above, one or both of the nodes A and B include one or more local input devices 36 and 38, referred to interchangeably as "local input device A" and "local input device B." The local input devices A and B make local modifications (e.g., inserts, updates and deletes) to the data in the respective databases A and B as part of a complete transaction in a similar manner as the application programs described in FIG. 1 of U.S. Pat. No. 6,122,630. Alternatively, the local input devices A and B may be located outside of the nodes A and B, and may be connected via a communication medium to the nodes. The local input devices A and B may be batch programs having no user or terminal I/O.

The databases A and B, audit trails A and B, collectors A and B and consumers A and B are connected together as discussed above in the definitions section. More particularly, the collector A is connected to the consumer B via communication medium 40 to provide primary replication, and the collector B is connected to the consumer A via communication medium 42 to provide standby/reverse replication.

In operation, any modifications made by the local input device A to the database A must be replicated in the database B. Likewise, any modifications made by the local input device B must be replicated to the database A.

The system 10 also includes restart files 22 and 34 connected to respective collectors 18 and 30. The function of the restart files 22 and 34 is described above in the "Definitions" section. The system 10 preferably includes additional elements and steps to prevent ping-ponging of transactions.

One preferred embodiment of the present invention is implemented using the system architecture of FIG. 1.

Overview of Present Invention

In a first embodiment of the present invention, a marker is assigned to a block of data, the marker is sent to other nodes via the normal replication system, and the data is sent to the other nodes without going through the normal replication system.

More specifically, the first embodiment provides a scheme for synchronizing plural databases in a database replication system including a plurality of nodes connected via communication media in a topology. Each node includes a database, an audit trail of all transactions posted to the database, and a transaction transmitter which sends selected transactions in the audit trail to one or more other nodes. In the broadest sense, the scheme operates as follows:

1. A block of data is read from a source database at the first node. The block of data has a predetermined byte size, and as many rows of data as can fit within the predetermined byte size are read from the source database. A dynamic throttling scheme may be used to dynamically change the predetermined byte size based upon processing conditions at one or more of the nodes. For example, referring to the configuration in FIG. 2 of U.S. Pat. No. 6,122,630, consumer B may send signals to node A to initially set, or change the block size depending upon its processing capabilities. Consumer B may initially set the block size to a predetermined maximum size, and then throttle back, if necessary.

2. A marker is assigned to the block of data. Each block of data includes one or more rows of data. The marker for each block of data may indicate the keys for the rows of data within the source database. More specifically, the marker created for each block of data indicates the keys for the rows of data within the source database that corresponds to the marker, or a low and high key range of the block of data. The key range does not necessarily include every row of data, since one or more rows of data within the key range may have no data.

3. The marker is written to the audit trail at the first node.

4. The transaction transmitter at the first node sends the marker in the audit trail to a second node having a target database.

5. The block of data is sent from the first node to the second node without passing the block of data through the audit trail.

6. At the second node, the block of data is stored in the target database upon receipt at the second node of the block of data and the marker assigned to the block of data. An insert operation may be used to perform this function.

7. Steps 1 through 6 are repeated for additional blocks of data in the source database, wherein a marker is assigned to each subsequent block of data. The scheme thereby allows some or all of the source database to be replicated to the target database without having to store or pass any data in the source database in or through the audit trail at the first node.

In one preferred scheme, each block of data in the source database is locked after it is read, and is unlocked in the source database after the corresponding marker is written to the audit trail.

Figure 2:
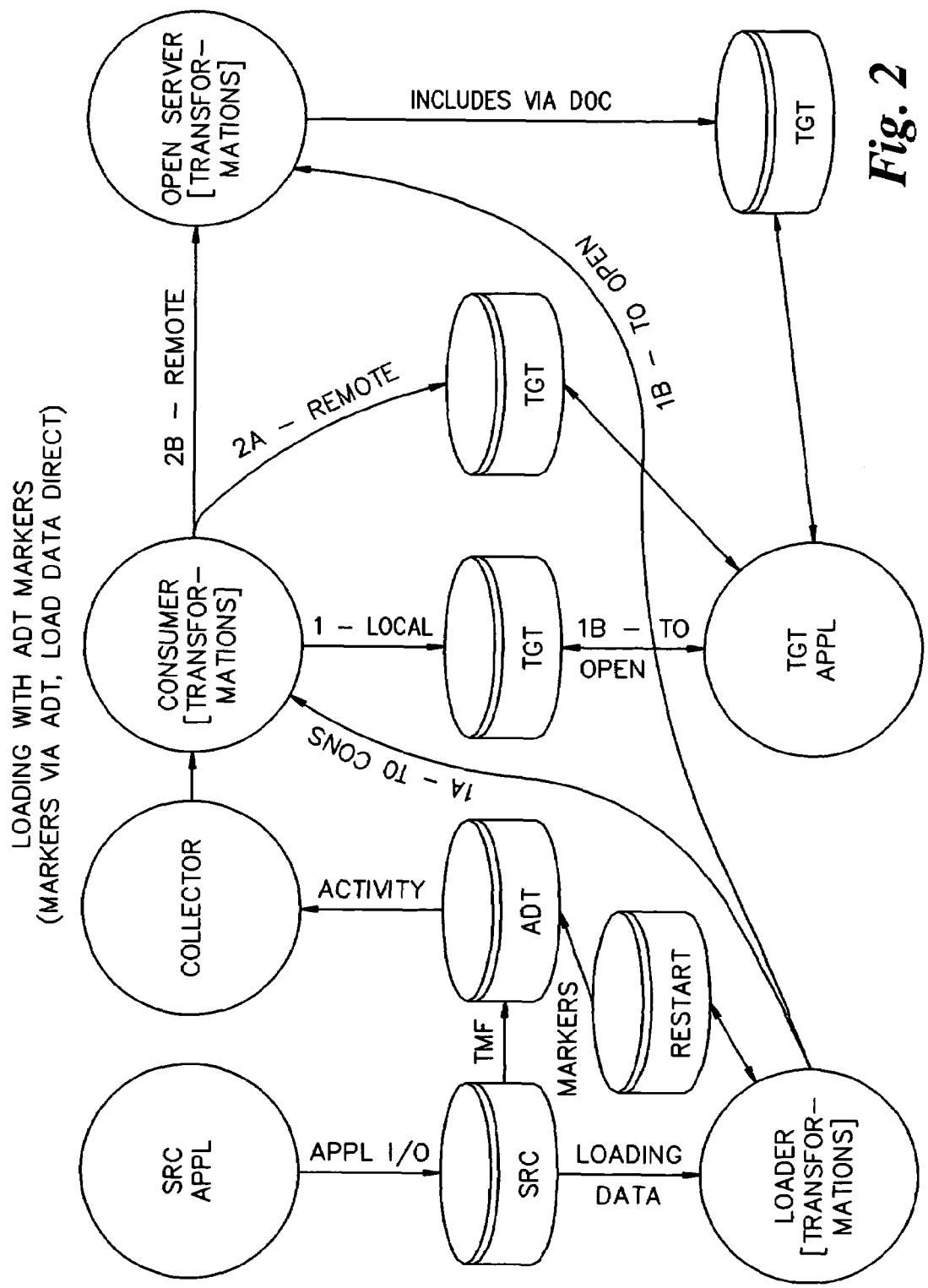
FIGS. 2-5 are schematic block diagrams of synchronization/loading schemes in accordance with the present invention.

An important feature of the present invention is that the source database and the target database may both be on-line during the synchronization. Consider an example wherein the target database and the source database are both "live" databases that are each receiving transactions from applications and/or end users, as shown in FIG. 2 of U.S. Pat. No. 6,122,630. Using the scheme of the present invention, the target database can remain in a "live" state during the synchronization. Alternatively, the first database and the second database may both be offline during the synchronization, or one of the databases may be on-line, and the other database may be offline during the synchronization.

When the source database is on-line during synchronization, the second node will receive replication stream commands intermixed with markers. To ensure proper synchronization, during step 6, processing of the replication stream commands should be suspended upon receipt at the second node of a marker until step 6 is performed for the block of data corresponding to a newly received marker.

A loader at the first node may be used to read the block of data from the source database, write the marker to the audit trail, and send the block of data to the second node. Alternatively, the collector or transaction transmitter at node A may perform the functions of the loader. In this process, the block of data is written into the transaction transmitter at the first node after the block of data is read, and the transaction transmitter at the first node sends the block of data to the second node.

The loader may assign the marker to the block of data. Alternatively, the marker assignment may be performed positionally (i.e., the first block of data is associated with marker 1, the second block of data is associated with marker 2, and so on). In a "positional" marker assignment scheme, the markers are not actively given an identification number. In a positional scheme, the first marker created becomes marker 1 and the corresponding first block of data becomes block of data 1, and so on. Other assignment schemes may be used as well, such as the TCP/IP sequence number. In a "non-positional" marker assignment scheme, such as when the loader assigns the marker to the block of data, each marker is actively assigned a specific identification number, and the corresponding block of data is assigned the same identification number. In a "positional" scheme, each marker may have the same value. A non-positional scheme is more flexible than a positional scheme because many loading threads can run in parallel in a non-positional scheme. Also, in a positional scheme, loss of one block or a marker can affect the coordination of the marker and block of data.

The blocks of data and the corresponding markers may flow from the first node to the second node asynchronously. In this manner, the blocks of data may be stored in the target database asynchronously with respect to the order in which the blocks of data are read from the source database.

The target database may be loaded in primary key order using an append operation (i.e., bulk inserts). In this embodiment, each block of data includes one or more rows of data. Step 1 above is performed in primary key order of the target database. Step 6 is performed by a single or series of append block operations which automatically insert all of the rows of data within the block of data into the target database.

If the target database is initially empty, application updates during synchronization may be handled as follows: Either the marker for each block of data, or the block of data itself, indicates the keys for the rows of data within the source database. Any transactions executed on a row of data in the source database during the synchronization are sent to the audit trail, and then are sent by the transaction transmitter from the audit trail to the second node for posting to the target database. At the second node, the received data associated with the executed transactions are posted to the target database only if the row of data, or a key range inclusive of the row of data, corresponding to the received data has been previously posted to the target database through the synchronizing process.

The present invention may also be used during resynchronization of the target database, wherein the target database is not initially empty, by using a cross-comparison of equivalent key ranges in the target database. In this scheme, each block of data has a key range. During step 6, for each block of data sent from the first node, the corresponding key range in the target database is compared, and the block of data is processed as follows:

(a) If a row in the block of data is not present in the target database, the row and its content are inserted into the target database.

(b) If a row in the block of data is present in the target database but has content that does not match the content of the row in the block of data, the row is updated with the new content.

(c) If any rows are missing from the block of data but are present in the target database, then such rows are deleted from the target database.

The markers for each block of data may be unique markers, virtual markers (described below), or non-unique markers (when used in a positional scheme, described below).

In a second embodiment of the present invention, resynchronization is performed by using a marker and an indicia of the contents of the data. This scheme reduces the amount of data that must be transmitted from the first node to the second node, thereby reducing processing time and bandwidth requirements.

More specifically, this scheme synchronizes plural databases in a database replication system including a plurality of nodes connected via communication media in a topology. Each node includes a database, an audit trail of all transactions posted to the database, and a transaction transmitter which sends selected transactions in the audit trail to one or more other nodes. In the broadest sense, the scheme operates as follows:

1. At least one row of data is read from a source database at the first node. The row of data may be a block of data having a specified key range.

2. A marker is assigned to the at least one row of data.

3. The marker is written to the audit trail at the first node.

4. The transaction transmitter at the first node sends the marker in the audit trail to a second node having a target database.

5. Indicia of the contents of the at least one row of data is sent to the second node and the indicia and the marker are received at the second node. The indicia of the row of data may be a CRC, a sequence number or a timestamp of the row of data.

6. Compare indicia of any corresponding rows of data in the target database.

7. Upon receipt at the second node of the marker for the corresponding at least one row of data, action is taken to synchronize the target database with the source database based upon the results of the comparison. In one preferred embodiment, the action taken is as follows:

(a) If a row sent from the source database is not present in the target database, then the content of the row is requested from the first database, and upon receipt, the row and its content are inserted into the target database.

(b) If a row sent from the source database is present in the target database but has indicia that does not match the indicia of the corresponding row in the target database, then the content of the row is requested from the first database, and upon receipt, the second node updates the row with the new content.

(c) If a row sent from the source database is present in the target database and has indicia that matches the indicia of the corresponding row in the target database, then no change is made to the content of the row in the target database and no content is requested from the first database. In many resynchronization processes, a large percentage of the data will likely match. Since the indicia of the data takes up significantly less bytes than the data itself, the resynchronization can be performed faster and with less bandwidth than performing resynchronization using the first embodiment.

(d) If any rows are missing from the data sent from the source database but are present in the target database, then such rows are deleted from the target database.

8. Steps 1-7 are repeated for additional rows of data in the source database, wherein a marker is assigned to each subsequent at least one row of data.

A loader may be used to read the row of data, write the marker to the audit trail, and send the indicia of the contents to the second node.

In one preferred scheme, each row of data in the source database is locked after it is read, and is unlocked in the source database after the corresponding marker is written to the audit trail.

When the source database is on-line during synchronization, the second node will receive replication stream commands intermixed with markers. To ensure proper synchronization, during step 7, processing of the replication stream commands should be suspended upon receipt at the second node of a marker until step 7 is performed for the rows of data corresponding to a newly received marker.

In a third embodiment of the present invention, a key range is used to determine when to post normal replication data to the target database. This process may be used during synchronization or resynchronization of the target database.

More specifically, the third embodiment provides a scheme for synchronizing a target database with a source database in a database replication system wherein the source database is on-line during the synchronization. (The target database may be on-line or offline.) Since the source database is on-line during the synchronization, the target database receives replication data during the synchronization. The source database is located at a first node of the system, and the target database is located at a second node of the system. In the broadest sense, the scheme operates as follows:

1. Successive blocks of data are sent from the first node to the target database. Each block of data has a key range, and each block of data includes one or more rows of data.

2. The successively sent blocks of data are posted to the target database.

3. The total key range of the blocks of data received at the target database is stored.

4. Any replication data received at the target database is posted only if the row of data, or a key range inclusive of the row of data, corresponding to the received data has been previously posted to the target database through the synchronizing process.

This embodiment may also be used during resynchronization of the target database, wherein the target database is not initially empty, by using a cross-comparison of equivalent key ranges in the target database. In this scheme, each block of data has a key range. During step 2, for each block of data sent from the first node, the corresponding key range in the target database is compared, and the block of data is processed as follows:

(a) If a row in the block of data is not present in the target database, the row and its content are inserted into the target database.

(b) If a row in the block of data is present in the target database but has content that does not match the content of the row in the block of data, the row is updated with the new content.

(c) If any rows are missing from the block of data but are present in the target database, then such rows are deleted from the target database.

In one alternative scheme, the successive blocks of data in step 1 are sent to the target database directly from the source database.

In some topologies, each node is not directly connected to every other node in the system, but instead indirectly communicates with some other nodes through other nodes. The scope of the present invention includes such topologies wherein markers, transaction data, and indicia of transaction data from an originating node are communicated to and from one or more receiving nodes via other nodes.

Detailed Disclosure

Referring to FIGS. 2-5, three separate target (TGT) databases are shown for three separate cases. "1-Local" means that TGT is local to CONS (e.g., on the same node) and is updated by CONS. "2A-Remote" means that TGT is remote to CONS (e.g., on a different node) and is updated by CONS. "2B-Remote" means CONS is sending to an Open Server that performs the I/O to TGT.

FIG. 2 shows an alternative design for loading in accordance with the present invention. This design serves as the basis for all subsequent schemes of the present invention, and continues to use the Shadowbase replication product base for the load process. However, the scope of the present invention is not limited to use within Shadowbase, and includes use in other platforms and products.

A. One vs. Many Processes

In this design, the COLL and CONS and OPEN SERVER objects can be implemented as the same or separate processes. Typically, if the COLL/CONS/OPEN SERVER were on the same system, they would be implemented as the same process, and if on separate systems they would be implemented as separate processes.

B. Restart File Definition

Referring to FIG. 2, the design includes the definition of a RESTART file/table (normally AUDITed on transaction-protected systems) that contains two records or equivalent data structures per on-line loading thread. The records have the following considerations:

(1) The first record contains context about where the LOADER is in the loading stream, and optionally includes the location/id where the LOADER stored the block of records to be loaded. This record is updated at the end of reading each block of records being loaded. (This update serves as a marker in the audit stream that typically tells the CONS where to insert the loaded data into the stream.)

(2) The second record is the true RESTART point for the LOADER, in the event that the LOADER fails or is shut down and needs to restart. This record is updated by the CONS after it safestores the block of records into the target (and can optionally contain the location/id of the block of records that is now free/available). The update should typically be done under the same transaction as the CONS used to safestore the block of records so that the entire block/restart point is saved or backed out (i.e., remains consistent).

NOTE—If an interprocess messaging/interprocess communication (IPM/IPC) or similar request/reply method for LOADER to CONS communication is used, the REPLY can return this information to the LOADER, and the LOADER can update the second record directly.

C. Binary Large Object (BLOB) Replication

BLOBs are typically large data objects resident in a database. Examples include images and audio feed, or any other data structure that is treated as a unit. By inserting the marker at the appropriate point in the audit trail, the BLOB can be sent via a separate channel (or perhaps read directly by the CONS) that is optimized for BLOB access. In this manner, the BLOB does not overflow/overwhelm the buffers of the replication engine.

D. Size of a Block

Although not required, the block of records being loaded will typically fit into one target transaction. The size of this block can be selected based on the number of records that fit, processing time for a block (e.g., wall or cpu utilization), transaction lock count (i.e., the number of locks that a transaction can hold), system busy/cpu busy time used to process the block, etc.

E. Dynamic Load Throttling

The design of the present invention supports dynamic load throttling. This technique is used to manage the amount of system resources taken by the loading process, and is typically set to avoid adversely impacting the application environment. For example, the LOADER can determine system busy rates and increase/decrease its processing rate (e.g., by increasing or decreasing an inter-record or inter-block delay interval). Other techniques, such as the rate the CONS can process the loading blocks could be used as well, etc.

F. Single vs. Multiple Loading Threads (in Parallel)

The design of the present invention supports running multiple loading threads in parallel.

(1) Each such thread contains its own set of information to manage its load operation independently of the other concurrently running load threads.

(2) If multiple such loaders are active at the same time, the CONS associated with the replication engine will track each loading thread progress independently. Hence, when deciding whether to keep or discard an application update that occurred during the load, the CONS will check the currently loaded ranges for all active loading threads before discarding (or applying) the update.

(3) The insertion of the target data can be performed via INSERTs or APPENDs, depending on the scheme used. There is usually no limit on the number of INSERT loading threads that can run in parallel. APPEND loading threads are usually limited to one per target database partition, hence the maximum APPEND loading threads is usually limited to the number of target database partitions.

G. Data Collection/Log Techniques—Definition of Audit Trail

The design includes many data collection techniques, not just the classic transaction monitor and transaction "redo"/"journal" log, or audit trail, approach defined and used in the Autoloader product. The primary features of these data collection techniques are that they collect, retain, and serialize the database update activity. Some even provide transactional integrity (i.e., a set of database updates is either fully applied or fully undone). The collected data is saved in a "log" that may be disk-based, memory-based, an application log file, or other queue structure. The data may be stored in transient or non-transient storage. The present invention includes the following data collection techniques:

(1) Reading database "redo" logs. These logs are typically maintained by a transaction processing (tp) subsystem provided by the O/S or database vendor. They typically contain database "before" and/or "after" record images, as these images can be used to restore the before state of a record update (abort situation) or to apply the after state of a database update (commit situation). These monitors typically provide transactional database integrity. Access to these logs, and understanding the format of the data in them, is required to use this technique. Salient features include:

(a) The application and the replication engine are usually "loosely coupled" (i.e., they run independently, and can be independently tuned).

(b) The tp subsystem usually provides automatic redo log retention/management.

The Compaq Transaction Monitoring Facility (TMF) provides this functionality on an NSK system.

(2) Reading database "image" logs. These logs are typically maintained by the application itself, and they contain similar information to the redo logs. The application may or may not provide transactional database integrity. Access to these logs, and understanding the format of the data in them, is required to use this technique. Salient features include:

(a) The application and the replication engine are usually "loosely coupled" (i.e., they run independently, and can be independently tuned).

(b) The application subsystem usually provides automatic image log retention/management.

The Tenera Plant and Information Management System (PIMS) application, commercially available from Tenera Inc., San Francisco, Calif., provides this functionality in the database "cradle" and log files.

(3) Using database triggers and/or stored procedures to perform the collection of the database change data, and saving the gathered data into a collection log. This technique requires that the database provide a trigger/stored procedure mechanism (or something similar) that is available to the replication engine. Salient features include:

(a) The application and the replication engine are usually "tightly coupled" (i.e., they run interdependently), at least for the data collection part.

(b) The replication engine must provide its own log retention/management.

The Shadowbase "open" collection environment (e.g., Solaris/Oracle, Windows/MS SQL Server, etc) offers this approach for capturing database change data for the replication engine.

(4) Using an "intercept" library that intercepts application disk I/O calls and saves the database change data into a collection file. This technique requires that the O/S and/or application environment provide an intercept mechanism that is available to the replication engine. Salient features include:

(a) The application and the replication engine are usually "tightly coupled" (i.e., they run interdependently), at least for the data collection part.

(b) The replication engine must provide its own log retention/management.

(c) The application must have the intercept library bound or linked into it (or similar technique). Typically, this requires no coding changes, as the intercept library intercepts the calls, saves the database change data, and executes the I/O (noting if it succeeded or failed).

The Golden Gate Extractor/Replicator product, commercially available from Golden Gate Software, Sausalito, Calif., provides this technique for event capture. The NTI DrNet product, commercially available from Network Technologies International, Inc., Westerville, Ohio, provides this technique for event capture.

(5) Using a "callable" library application-programming interface (API) that performs the application disk I/O on behalf of the application. The library performs the data collection similar to the method used by the intercept library. Salient features include:
  (a) The application and the replication engine are usually "tightly coupled" (i.e., they run interdependently), at least for the data collection part.
  (b) The replication engine must provide its own log retention/management.
  (c) The application must have the callable library bound or linked into it (or similar technique). Typically, this requires application coding changes, as the application must call the API for all disk I/O.

The NetWeave product, commercially available from Vertex Interactive, Clifton, N.J., is an example of this technique.

H. Transaction Integrity

For those environments that provide transactional integrity, referred to as "audited" systems, the replication engine should mimic that transactional integrity on the target system. This means that all I/O's in the source transaction are either committed (applied) or aborted (not applied) depending on the final state of the transaction. (If the transactional integrity of the source is not mirrored, the referential integrity on the target may be violated.) Since some replication implementations will apply the database I/O's as they occur, the actual transaction profile of commits/aborts on the source and target databases is preserved. For those implementations that defer applying the I/O's until the final transaction state is known, and then replay them in commit order, typically only committed transactions are applied.

For those environments that do not provide transactional integrity, referred to as "non-audited" systems, the replication engine must treat all individual, successful database change I/O's as if they consist of a begin (implicit), database I/O, and a commit (implicit). Certain unsuccessful database I/O's are still treated as if they were successful, for example if the base table was updated successfully, yet an index path failure occurred (as the file system would allow the base table/index inconsistency to remain).

I. Commit vs. Abort for Loading Operations

Certain transactional environments force a transaction to be active in order to access the source data. In these environments, the transactions used to read the data to be loaded can often be aborted rather than committed. The choice of which one to use depends on the specifics of the transaction monitor's implementation, as one will provide certain efficiencies over the other. In either case, any locks acquired during the transaction will be released when the transaction completes.

J. Lock Definition

The term "lock" as described herein refers to the classic definition of a file, record, or field lock. That is, once the object is locked, the data is protected against access by other users/processes. For purposes of explaining the present invention, there are typically two types of locks—shared and exclusive. Reading data usually requires the granting of a shared lock to that data. Shared locks can be "short" (only held long enough to read the data), or "long" (held after the data is read). Typically, multiple shared locks can be granted for the same data at the same time. Updating the data usually requires the granting of an exclusive lock to that data.

Locks are usually queued against the object in the order issued (although other schemes, such as priority-based, last-in-first-out, wait length, etc, can also be used), with the lock at the front of the queue being granted, and sequentially subsequent locks only being granted simultaneously if the granted lock is shared and the next lock(s) in line are shared. An exclusive lock is only granted if it is at the front of the object's lock queue, and no other locks have been granted against the object. Once granted, an exclusive lock prevents any other locks from being granted against that object, until the exclusive lock is removed.

The scope of a "lock" includes other similar implementations of a locking approach, such as a "lock" table maintained by the application, etc. Using a lock table approach, lock requesters check the status of the object in the table, then either are granted the lock, or wait for the object to become available, as defined above.

K. Data Access Protocols

The following details are provided regarding data access protocols (i.e., record locking):

(1) REPEATABLE access is defined as a lock that is created when the data is accessed (read, inserted, updated, or deleted), and is held until the commit or abort occurs or another explicit operation releases it. For some schemes where REPEATABLE access is mentioned, i.e., those that perform sequential read access to the source data (typically along a key path) while building a block, REPEATABLE also implements a range lock, meaning that no records can be inserted between the lowest and highest key values or records of the block being read, as the block is read, until the commit or abort occurs. The range lock provision defends against the race condition that could otherwise occur when the records in the block being built/saved are also asynchronously modified (inserted/updated/deleted) by another application (if this were to occur, the replication path and the loading path can have a race condition as to which arrives at the CONS first). Hence, REPEATABLE access approaches typically only require one marker to be sent via the audit trail after the block is read, as no updates to the range of data represented by the block can occur (i.e., at the time the marker is sent, the block exactly matches the source database for that key range). Special conditions also exist for range locks for the "first" and "last" records along the key path. In this case, the range lock prevents inserts below the first, and above the last, record in the file until the range lock is removed.

(2) STABLE access is defined as a lock that is created when the data is read, and is immediately released once the "clean" copy of the record image is obtained. STABLE access will wait for other locks to be resolved before it is granted. The basic issue with STABLE access is that the record can be immediately updated by another application after the clean copy is read, and/or other records can be inserted/updated/deleted immediately below or above the clean record along the key path. Hence, a race condition can exist between the replication path and the block loading path, which multiple events can mitigate:

(a) A first marker is sent when the block is starting to be read/filled. This alerts the CONS to hold up the replication stream at that point.

(b) Once the block arrives, the CONS inserts it at that point, and continues processing the replication stream. Referential integrity may be violated for the brief period from this point until the replication stream representing the time the last record in the block was read is processed.

(c) In one alternative embodiment of the present invention, at the end of filling the first block, the LOADER could send a second marker, as the arrival of that marker in the CONS indicates that the brief time of possible referential integrity violation is over.

(3) BROWSE access is defined as reading the record data and not acquiring any locks, nor waiting behind any other locks. The data read may be "dirty," meaning it may be undone by a subsequent abort operation. Any dirty data loaded at this time may violate referential integrity if that transaction is ultimately aborted. In addition to the dirty data problem, the STABLE access race condition can also occur, meaning that a longer period of referential integrity violation will be suffered than in the other access methods. To use this access method:

(a) A first marker is sent when the block is starting to be read/filled. This alerts the CONS to hold up the replication stream at that point.

(b) Once the block arrives, the CONS inserts it at that point, and continues processing the replication stream. Referential integrity may be violated for the brief period from this point until the replication stream representing the time the last record in the block was read is processed, and until the ultimate state of any pending transactions is known.

BROWSE access is usually the fastest access method, does not lock data, can return dirty data, and allows for the most concurrency. STABLE access is the second fastest, (may) briefly lock data, will only return clean data, and allows for moderate concurrency. REPEATABLE access is usually the slowest access, always locks the data, will consistently return the same clean data when i/o's are issued under the same transaction, and allows for the least amount of concurrency (it holds the locks the longest).

L. Alternate REPEATABLE Access Definition

A special condition may exist for implementations that cannot use REPEATABLE access (or where REPEATABLE access cannot provide range locking). For example, in the case of a replication configuration that wants to discard replication I/O that is outside the currently loaded and synchronized key range, and cannot use REPEATABLE access, the following algorithm allows the implementation to succeed. In these cases, in addition to brief periods of referential integrity violation, the race condition presented by the multiple data paths (load data path and replication path) means that an alternate technique should be considered:

(1) At the start of reading the block from the source database, the LOADER will send a marker via the Audit trail to the CONS.

(2) Upon receipt of the first marker, the CONS will note its position in the replication stream and keep processing the replication stream, discarding all I/O's outside the currently loaded points.

(3) Upon filling the block, the LOADER will send a second marker via the Audit trail, and asynchronously send the block to the CONS.

(4) Upon receipt of the second marker, the CONS will pause the replication stream. It will then access the block, and replay all feed from the first marker to the send marker against it for the key range represented by the marker and contained in the block. (At this point, the block properly represents all source database information between the starting and ending keys in the block.)

(5) The CONS applies the source block into the target.

(6) The process continues until all blocks are loaded.

M. Concurrency vs. Speed when Reading Source Data

The scope of the present invention includes reading the source data a record at a time, as well as a block at a time, depending upon the features provided by the source database. For example, each record may require its own I/O, or the entire block of records may be read in one I/O. When the source database is on-line, a record-at-a-time approach will typically be used, along with one of the previously described data access protocols. When the source database is offline, no locks are required, thereby allowing for more block-oriented reading approaches.

N. Scheme 1 of Present Invention

FIG. 2 shows one preferred embodiment of the present invention. The elements shown in FIG. 2 relate to similarly named elements in the system architecture shown in FIG. 1.

(1) Upon startup, each LOADER creates the 2 records in the RESTART file.

(2) The LOADER then loops, until all records in the loading path have been processed. It reads and locks (e.g. REPEATABLE) a group of records, stores them into the CONS's input queue (e.g., via interprocess messages, or a high performance memory queue), and then the last operation that it does is to insert a marker into the audit trail (update record 1). Then, either commit or abort, releasing all locks. It runs asynchronously, at a configurable rate, making sure it does not overload/overrun the CONS's input queue.

(3) In the CONS, when it gets the marker via the audit trail (or the COMMIT for the marker), it knows it can INSERT (not UPDATE) the block of records into the replication stream without causing any referential integrity problems. So, it reads the block of records and adds them into the stream as inserts (discarding the marker). If the INSERT fails with duplicate key error, it can do an UPDATE (this may be perfectly acceptable as the target needn't be empty when the load begins). After that last record in the block has been written into the target, it updates the second record in the RESTART file with the key of the last record processed, making sure it is part of the same transaction.

(4) When reading a record into the block, if a lock timeout occurs in the LOADER, the LOADER has collided with the application. The LOADER will send as much of the block of load data as is filled, and immediately insert the marker into the audit trail (update record 1). Then, either commit or abort, releasing all locks for the records it was able to load, and repeat the cycle for the next block.

Alternatively, when reading a record into the block, if a lock timeout occurs in the LOADER, the LOADER will release all locks, delay some time period, and retry as the loader may have hit a deadlock with the application.

Alternatively, when reading a record into the block, if a lock timeout occurs in the LOADER, the LOADER can skip past the locked record by repositioning "past" or beyond the locked record, and continue reading from that point forward. At some later time, the LOADER can reprocess the key range from the last successful read below the first successful read above the locked record, exclusive of the starting and ending points.

The timeout of the LOADER should typically be shorter than the timeout of the application (so as to impact the loader when the lock "collision" occurs, not the application).

Upon failure, the LOADER restarts from record 2 point (last safestored point).

Both sides can run in parallel, and there can be as many LOADERs running as needed (meaning the CONS should never block/wait on loading I/O arriving into it). Very fast/efficient interprocess communication methods between the LOADER and the CONS can be used (e.g., memory queues, semaphores, and the like, or interprocess communication messaging if the CONS wants to manage the arrival of the loaded data internally).

The size of the record blocks can be configurable, based on application profiles (e.g., how long the block of source records remains locked and how big the blocks are).

Dynamic throttling information may be exchanged between the LOADER(s) and the CONS, particularly if request/reply IPC is used. (The conventional Autoloader method only supports static throttling).

Positive and negative aspects of the present invention are listed below, with positive aspects indicated by a (+) symbol and negative aspects indicated by a (−) symbol.

(1) Referential Integrity is preserved (+).

(2) Avoids increasing AUDIT data, except for a small marker for each block of records being loaded (+). Loaded data is not stored to disk in an intermediate file/format.

(3) Loading data and application change data use same set of user exits/maps (+).

(4) AUDITCOMPRESS can remain on the source file/table (+).

(5) Many LOADERs can be running in parallel for different ranges of the same table, and the LOADERs and the CONS run asynchronously (+).

(6) Restartable & supports key ranges (+).

(7) Design is portable (+).

(8) CONS is able to discard updates for all data that is outside the ranges being loaded because it knows that the LOADER will eventually send those (e.g., use the marker to identify to the CONS the min/max key of what was loaded already, CONS can discard those updates outside this range). This means DEFAULT clauses need not be created for target columns, etc., as compressed updates outside the currently loaded range will be dropped (+).

(9) Loaded data applied first as an INSERT, can map to an UPDATE if needed (+).

(10) Throttling information can be dynamic (can adapt based on system resource availability as LOADER and CONS directly communicate) (+).

(11) LOADER can have sophisticated record/row selection (WHERE clause) to minimize the amount of data it reads (+).

(12) LOADER could have user exits bound in for filtering, transformation, etc (offload that processing from CONS) (+).

(13) LOADERs are dependent of replication (i.e., they cannot run unless the replication infrastructure is available) (−).

(14) May decrease concurrency in the source application (may slow down source application if a record lock collision occurs) during brief time that the block of records being loaded is locked (−). By using REPEATABLE access, the loading record's lock is held until the final commit or abort. Alternatively, a STABLE lock or Browse access could be used (see discussion below).

O. Scheme 1A of Present Invention

Referring again to FIG. 2, Scheme 1 may be modified to allow the LOADER to send (perhaps via a fast FTP-type thread) and prestore the block down in the target, so when the marker arrives in the target via the AUDIT trail path, the block is inserted into the proper spot and the records are replayed into the target.

This scheme basically contains the same trade-offs as scheme 1, and works well if the user exits/filtering and the like have been implemented into the target side (in addition to or instead of the source side). In this technique, the OLTP replication and the loading replication use different paths (each optimized for their activity), with the sequencer being provided on the target side. The CONS will have to pass the AUDIT markers to the target side rather than consume them.

Additional considerations regarding Scheme 1A are as follows:

(1) The current ITI Autoloader uses the AUDIT trail for synchronization of all data, on-line updates, as well as the loading data.

(2) Scheme 1 uses the AUDIT trail for markers to tell the CONS where to insert the blocks of loading data into the stream. The blocks of loading data arrive via another path.

(3) Scheme 1A is similar to Scheme 1 but it does the merging of the data down on the target system side, which may be desirable depending on the relative processing power of the systems, skill set of the developers (if any user exits need be developed), etc.

P. Scheme 1B of the present invention

This scheme is similar to Scheme 1 (see FIG. 2). This scheme either removes or greatly shortens the locking of the source data, but introduces short bursts of possible referential integrity violation on the target side.

In this scheme, the LOADER performs BROWSE access (reads through locks) for the blocks of records it reads, still using the AUDIT markers. It needs to make sure that each block it reads starts with a current batch of BROWSE (potentially dirty) data, since sequential block buffering (SBB) may keep stale data around across blocks. (One solution for Compaq SQL/MP databases is to close/re-open the SQL cursor with each block as this causes a flush of stale data and retrieval of current source data).

The first marker would work slightly differently though. It would be flushed through the AUDIT trail first, then the block of records read (BROWSE). Upon receiving the first marker, the CONS waits for and retrieves the block, applies it, and then continues. In this manner, the dirty data is applied before any possible COMMIT/UNDO's arrive for it). Special operation mapping are enabled for the target:

Additional considerations regarding Scheme 1B are as follows:

(1) Insert failures (due to record already exists) are mapped to Updates.

(2) Update failures (due to record does not exist) are mapped to Inserts.

(3) Delete failures (due to record does not exist) are treated as "no-operations".

One slowdown/bottleneck problem occurs if the first marker arrives at the CONS before the block arrives, meaning the CONS is waiting on the LOADER(s) to read and send the block of data. This can be mitigated (somewhat) by having the LOADERs send two blocks (or more) per burst, a small one followed by a much larger one. When the first marker and then block arrives, the CONS will be busy processing it while the LOADER is generating the second block. Throttling delays may be inserted after each of the two-block bursts.

Alternatively, instead of using BROWSE access, the LOADER may use STABLE locking access. In this mode, a clean/consistent record would be read by the LOADER, and sent to the CONS. The lock (if issued at all) is only held very briefly for that record until a clean/consistent record was read, then it is freed.

Using this approach, the LOADER would again need to send the marker prior to reading the block of data, and upon receipt of the marker, the CONS would wait for the block to arrive. Referential integrity could also be briefly violated, this time not from reading the dirty data from aborts, but rather because of the timing difference (race conditions) that could occur between the loading path and the marker/replication data path. Fortunately, the possibility of a referential integrity violation is short-lived and is automatically resolved when the replication stream catches up to the point representing when the last clean record for the block was read.

Q. Scheme 1C of the Present Invention

Figure 3:
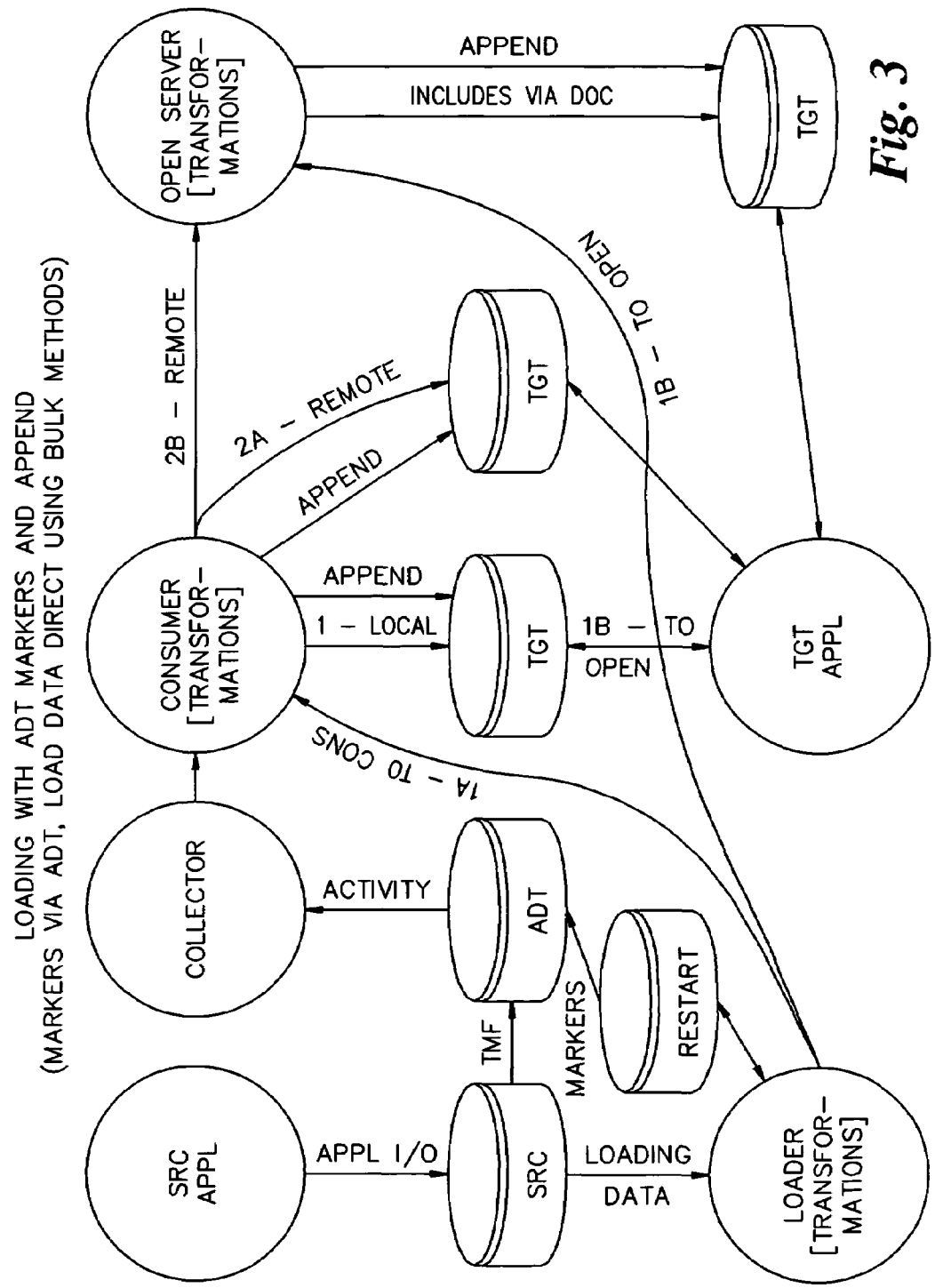

FIG. 3 shows another embodiment of the present invention that combines OLTP with various BULK features.

This approach starts with an empty target, and loads in ascending (or descending if the file system allows it) TARGET primary key order. (The source may have the same primary key as the target, an index path that matches the target's primary key, or must read/sort the data to be loaded). The key point is the loading data needs to be presented to the target in the target's primary key order (either ascending or descending) or in whatever order the APPEND-type operation allows.

In this scheme, OLTP data changes are sent conventionally, through the AUDIT trail to the CONS process. Any change data that arrives is applied into the target database, except that the CONS does not apply data that has a higher primary key than the current load primary key. All such I/O's are discarded (the loading method is always applying loading data to the current 'end' of the primary key path).

Loading data is batched and sent to the target database via one of the previous scheme methods (e.g., with or without locking markers, via separate FTP steam, etc.), using the AUDIT trail markers to know where to insert the loading block into the replication stream (e.g., read/lock data and send marker, or send marker and read potentially dirty data as described previously, etc.).

The data is loaded using an APPEND operation, which is a high-performance BULK type of operation. The blocks will be inserted at the end of the primary key path very quickly.

The target doesn't have to be empty at the start of the load operation because APPEND operations insert at the current 'end' of the primary key path, in primary key order.

This scheme contrasts to the previously described schemes in the following ways:

(1) Previously described schemes use individual INSERT/UPDATE operations for each record being loaded, whereas this scheme uses an APPEND for a block of records being loaded as the records in the block are already in the correct key order. (APPENDing a block is usually much faster than INSERTing/UPDATEing the records in that block individually).

(2) Previously described schemes can have multiple load threads running at a time, whereas this scheme can typically only have one (always appends at end of current primary key path). Note that this restriction may not be valid for partitioned target databases.

(3) Previously described schemes can ignore loading data outside the range being loaded, whereas this scheme has a requirement that all such data be discarded and no data exist along the primary key after the load block's current append point.

(4) Previous schemes allow the data in the block being loaded to be in any order in the block, whereas this scheme requires all data in the block to be ordered along the primary key path.

R. Scheme 1D of the present invention

Figure 4:
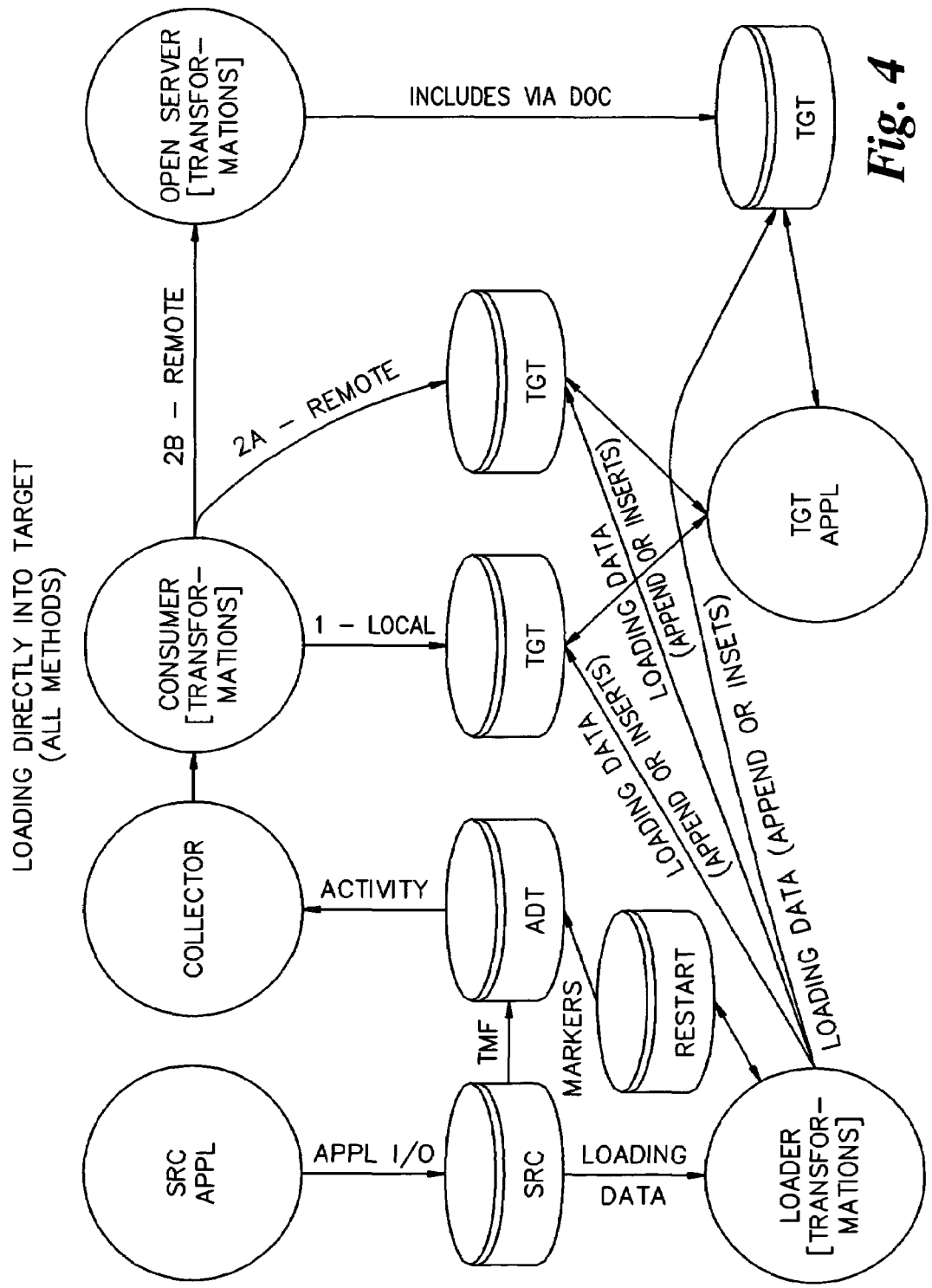

FIG. 4 shows another embodiment of the present invention wherein the LOADER(s) feed the target databases directly. For a block being loaded, it can either be individual record I/O (INSERTs), or block APPENDs.

If locking the source data during processing of the block to load is acceptable, this scheme operates as follows:

(1) First, the LOADER reads/locks the next block to load using REPEATABLE access.

(2) Next, the LOADER stores the block in the target (APPEND or individual INSERTs).

(3) Next, the LOADER sends a marker via the ADT (asynchronously). This tells the CONS the location the loading process is up to/through (CONS can discard application updates outside this range, etc).

(4) Finally, the LOADER releases the locks and repeats the loop until all data has been loaded (e.g., issue a commit).

Under this scheme, referential integrity is preserved.

If the LOADER cannot lock the source data (BROWSE access), or can briefly lock each record while a consistent image of that record is read (STABLE access), this scheme operates as follows:

(1) First, the LOADER sends (asynchronously) a marker via the ADT. This marker tells the CONS to pause the replication stream at this point (and may include current load range key points).

(2) Next, the LOADER reads (BROWSE or STABLE) a block of current (possibly dirty if BROWSE) data to load.

(3) Next, the LOADER stores the block into the target (APPEND or individual INSERTs).

(4) Next, the LOADER asynchronously sends an "expedited" marker to the CONS telling it that the replication stream can be restarted (and the key ranges the loading process is up through). An expedited marker is a message that jumps ahead of all other data in the audit/replication stream, except other expedited markers. In a practical sense, this second marker may be sent via an asynchronous "signal", semaphore, IPC message, etc.

(5) Finally, the loop is repeated until all data has been loaded.

Under this scheme, referential integrity may be briefly violated (for BROWSE access, until all active transactions that affected data in the block being loaded have been resolved; for STABLE access, until the replication stream catches up to the point when the last record in the block was read).

S. Scheme 1E of the present invention

This is basically a verification and validation (V&V) scheme, as well as a 'resynchronization' of the target and the source (or vice-versa) scheme (the V&V tells us something is wrong, the resynchronization fixes it).

In a V&V scenario, the user wants to determine if replication is working correctly. That is, the user wants to determine if the source data is being properly replicated, and saved, in the target. This can consist of either a 100% V&V (i.e., ALL data from the source is compared to the target), or a selective statistical sample (sampling interval chosen to provide a high confidence in the result).

Performing a V&V is typically a read-only activity. Reporting on the discrepancies found is usually the result.

When used for a resynchronization task, the scheme actually fixes the data that is in error. This can be a unidirectional V&V/resynchronization (make the target look like the source or make the source look like the target), or a bisectional V&V/resynchronization (make both look like the other, given some set of business rules to determine who has the more current version of data). (These business rules are typically application defined.)

This scheme has various uses, including the following uses:

(1) Quickly validating the databases, or a subset of the databases, against each other.

(2) For resynchronizing bisectional databases after replication has been down for awhile and it is impractical to synchronize the databases by replaying the suspended feed.

(3) For resolving the conflict caused when some external event forces the source and target databases to possibly go out of sync (e.g., a unilateral update to one database that is not captured by the replication stream).

(4) For when some failure has degraded the ability of the replication engine to be 100% complete (e.g., loss of some of the replication audit stream).

Regardless of the cause for running it, this V&V and resynchronization algorithm works while the database(s) are active and available for updating by application processes. Hence, no application downtime need be suffered.

This scheme can rely on many of the earlier schemes presented for extracting the data. (The resynchronization process can occupy any of the same bubbles as the loader process shown in FIGS. 2-5, wherein the loader operation is performed by the consumer in FIG. 5.) One such method is via the use of audit markers:

(1) Using the 'lock' method described in Scheme 1, have the RESYNC process read (REPEATABLE access) and send a block of records to the CONS (the RESYNC process can occupy any of the bubbles the LOADER does, and can be pulled into the CONS as well). Again, read the data in some reasonable key path order (typically primary key order).

The RESYNC process can send all record data in the block, as well as only sending identifying information such as the primary keys, with or without a CRC/update timestamp/update sequence number, etc.

(2) Asynchronously, send an audit marker via the AUDIT to the CONS and release all locks.

(3) Upon receipt of the AUDIT marker in the CONS, the CONS knows that the target should only have this set of records in the target database in between the block's starting and ending keys. Hence, it scans through the target's starting and ending keys, checking the source block vs. the target block. To make the target match the source:

(a) Delete ones from target not in source;
(b) Insert ones from source into target that are not in target;
(c) For those that exist in both, update target record to match the source (more efficiently, do a CRC/update timestamp/update sequence number type of check and only update those that are out-of-sync).

For a V&V run, it could just report on these conditions and not process them yet. The V&V tool should also provide 'special' user exits/configuration commands for these conditions and allow the user to override default behavior.

(4) Repeat this cycle for all subsequent blocks to be checked.

The above logic is correct for intra-block comparisons, however the V&V/resynchronization cycle needs to consider these additional steps inter-block:

(1) For the first block received, the CONS needs to delete all records from the target below/less than the starting key received in the first block (these records do not exist in the source, so delete them from the target).

(2) For each of the "middle" blocks received, the CONS needs to delete all records from the ending key of the previous block, up to (but not including) the starting key of the current block. This removes any records in between these two blocks from the target.

(3) For the last block received, the CONS needs to perform the middle block logic, plus delete all records from the target above/greater than the ending key received in the last block (these records do not exist in the source, so delete them from the target).

T. Scheme 2 of the Present Invention

Figure 5:
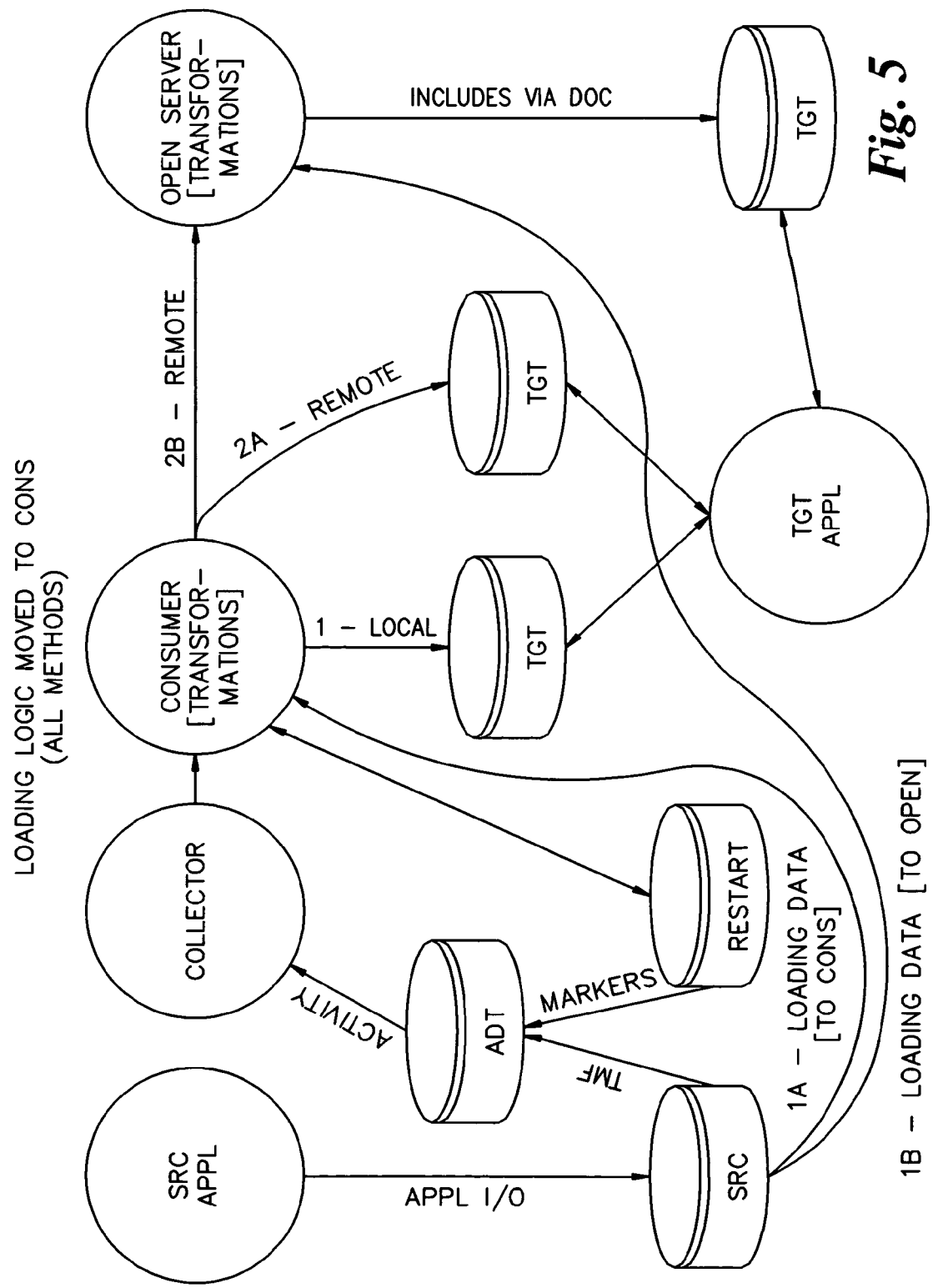

FIG. 5 shows another embodiment of the present invention. In this scheme, the LOADER logic and I/O is moved into the CONS to eliminate the separate LOADER process (es). This removes the coordination required that a separate LOADER and CONS would need. Moving the loading logic into the CONS (eliminating separate LOADER process(s)) can be used with all schemes of the present invention described herein.

When using REPEATABLE or STABLE access in the CONS for reading the blocks of data to load:

(1) At any point when the CONS is not busy processing replication stream data, or at some defined rate or otherwise appropriate point, read (and lock) the next block of records to load.

(2) Insert the marker into the audit trail.

(3) Release the locks acquired (this may be automatic for the STABLE approach).

(4) When the marker arrives at the CONS, insert the block of records into the target database.

(5) Repeat the cycle until all blocks are loaded.

The CONS need not wait for the marker to arrive before processing another block of records, assuming it can locally store multiple blocks of records while it waits for the associated markers to arrive.

This scheme does not violate referential integrity in the target database.

Alternatively, the CONS could use BROWSE access to read the blocks of data to be loaded. This method, however, may introduce a short period of referential integrity violation until the marker arrives in the CONS. Using this approach, the CONS could use sequences such as:

(1) At any point when the CONS is not busy processing replication stream data, or at some defined rate, insert the marker into the audit trail and read the next block of (possibly dirty) records to load.

(2) When the marker arrives at the CONS, insert the block of records into the target database.

(3) Repeat the cycle until all blocks are loaded.

Alternatively:

(1) At any point when the CONS is not busy processing replication stream data, or at some defined rate or otherwise appropriate point, read the next block of (possibly dirty) records to load.

(2) Insert the marker into the audit trail.

(3) Insert the block of records into the target database.

(4) When the marker arrives at the CONS, discard it. The period of possible referential integrity violation is over.

(5) Repeat the cycle until all blocks are loaded.

One deficiency of this scheme is that the CONS is tasked with both reading the data to load as well as processing the replication scheme traffic. This may decrease overall system parallelism somewhat, especially for those databases that do not allow asynchronous reads (such as the Compaq SQL/MP database). For those environments that do support asynchronous reads (such as the Compaq SQL/MX database), and especially those that support block read operations (where more than one record can be read at a time), the reads can be overlapped with replication stream processing. This, along with eliminating the coordination required between a separate LOADER and CONS design, may make moving the loading logic into the CONS advantageous.

As with all the other schemes, using virtual markers in this algorithm eliminates the marker processing, yet may introduce a short period of referential integrity violation until the replication stream catches up to the point where the block of records was read.

U. Scheme 3 of the Present Invention

Another scheme for loading uses the LOADER to read just the keys for the records to be loaded (using any locking mechanism (REPEATABLE/STABLE/BROWSE), and marker approach (prior or post block), previously described). The load blocks contain an array of one or more source data record keys.

The LOADER sends this block to the CONS, which then rereads the records directly out of the source database, and inserts them into the replication stream (as individual INSERTs or block APPENDs).

This scheme would only be implemented using BROWSE access since having the CONS re-read the data will always introduce a possible short-term referential integrity violation window (from the race condition between the replication stream and the direct read of the data by the CONS—the referential integrity window ends when the replication stream catches up to the point when the record was read).

This scheme is secondary to others presented above and is included for completeness.

V. Scheme 4 of the Present Invention

All of the ideas above assume a single CONS (or target writer process). One can configure multiple CONS, each with a unique key range for the target database (each CONS handles its key range to the same target database). Each CONS can then be either doing the load read/write I/O itself, or with one or more LOADERs, and using any of the record access/lock and marker schemes presented previously.

Assuming that at the end of the load one wanted to return to a single CONS, the replication streams would need to be coordinated for an appropriate cutover point. One technique to do this is to shut down all access (i.e., file opens) to the target database, and allow the replication streams to fully replay all data in their path. Another technique is that one of the loading threads could issue a LOCKFILE against the target database (or a lock range for the range being loaded), and when granted and the replication streams catch up, the cutover can be implemented. A third technique is to quiesce the source database application (e.g., by completing all current transactions and suspending new ones from starting).

W. Virtual Marker/Physical Marker Processing

"Virtual markers", sometimes referred to as "logical markers", can be contrasted with "physical markers" in several significant ways. All of the previously described "physical marker" schemes may be modified to use virtual markers.

A physical marker represents a data item, object, event, signal, call-back, interrupt, or other notification that flows through the system at a specific point in the processing stream, whereas a virtual marker merely represents a point in the processing stream where the marker logically exists. For a virtual marker, nothing actually flows or takes up space in the processing stream.

A significant feature of either marker type is that they both can be ignored, and the load process can still proceed successfully, albeit with possible short duration periods of referential integrity violation in the target database. For example, where the schemes describe inserting the marker into the audit trail, ultimately receiving the marker in the CONS, and inserting the block to be loaded when the marker arrives in the CONS, the marker operations can actually become null or no-operations.

More specifically, for a virtual marker example, if a LOADER reads a block and sends the block to the CONS, the CONS could simply insert the block into the target table when the block is received. In this case, the LOADER operation of inserting the marker into the audit trail after reading the block, and the CONS operation of holding on to the block until the marker has arrived, have become virtual operations against a virtual marker.

As an alternative example, for a physical marker, if a LOADER reads a block of data, inserts the marker into the audit trail, and sends the block to the CONS, the CONS could simply insert the block into the target table when the block is received. Later, when the marker arrives, the CONS could discard it.

The significance of treating the markers in this manner is that once the block is inserted into the target, it is possible for a short period of referential integrity violation to occur in the target until the marker arrives at the CONS. Once the marker arrives in the CONS, the period of possible referential integrity violation has ceased.

X. Marker "Piggybacking"

The path markers take to arrive in the CONS can be via many routes. The preferred embodiment of the present invention sends them via the audit trail. Another route can be via the same path the blocks of records to be loaded take, and those markers could be "piggybacked" onto the blocks of data to be loaded.

In this technique, the marker could contain sufficient information to identify where in the audit trail path they should be inserted. The marker is then added to the block of data records that is sent by the LOADER to the CONS. Upon receipt of the block of data records, the CONS could either insert the block immediately (allowing for a possible short period of referential integrity violation), or wait for the appropriate point (based on the information supplied in the marker) of where to insert that block of data records.

Y. Scheme 5 of the Present Invention

Another scheme for loading a target database is to send the source database changes in the order they occurred (called a "replication stream") to the CONS, which applies them into the target database. Concurrently, the LOADER reads and sends successive blocks of loading data to the CONS to be inserted into the target database by inserting the blocks of data into the replication stream at the point where the blocks of data are current, or consistent, with the replication stream traffic. The CONS then applies the replication stream to the target database, along with the embedded blocks of loading data, in the order received.

One method to insure that the blocks of data are current, or consistent, with the replication stream traffic is to:

(1) Use REPEATABLE access when reading the block of data to lock the block of data.

(2) Insert the block into the replication stream once the block has been read and locked.

(3) Release the REPEATABLE locks.

(4) Repeat for all successive blocks to be loaded.

The locks thus guarantee that the block of data being loaded is consistent with the replication stream traffic.

Alternatively, in step (2), the LOADER could insert markers into the replication stream, and send the blocks of data to be loaded directly to the CONS. Upon receiving the marker, the CONS will hold up the replication stream traffic until the associated block of data arrives. Once the block of data arrives, the CONS would discard the marker, apply the block of data into the target database, and resume processing the replication stream.

Alternatively, in step (2), the LOADER could send the marker (which indicates the proper replication stream insert point) along with the block of data directly to the CONS, and the CONS would insert the block of data into the replication stream at the appropriate point and apply the data into the target database.

Each of these designs could use STABLE or BROWSE access to avoid the record locks by sending the marker prior to the block of records being read, however brief periods of self-correcting, possible referential integrity violation may occur until the replication stream traffic catches up to the point where the block of data was read.

Z. Scheme 6 of the Present Invention

Another scheme for loading a target database is to send the source database changes in the order they occurred (called a "replication stream") to the CONS, which applies them into the target database. Concurrently, the LOADER reads and applies successive blocks of loading data into the target database (called a "loading stream"). The LOADER needs to insure that the loading stream path is "ahead of", or "faster", than the replication stream path (i.e., for any given block of data that is to be loaded, the data in the block to be loaded must be applied into the target database prior to any replication updates that are currently in the replication stream (but not yet applied to the target database)) for the data in that block. That is, the replication stream is occurring slower than the loading stream.

This scheme may introduce short periods of referential integrity violation that will self-correct after the replication stream catches up to the point where the block was loaded.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Changes can be made to the embodiments described above without departing from the broad inventive concept thereof. The present invention is thus not limited to the particular embodiments disclosed, but is intended to cover modifications within the spirit and scope of the present invention.

What is claimed is:

1. A method of synchronizing a target database with a source database in a database replication system, the method comprising:

(a) synchronizing the target database with the source database, the source database being on-line during the synchronization, wherein the synchronizing includes:

(i) sending successive blocks of data from the source database to the target database, each block of data having a key range, each block of data including one or more rows of data, (ii) receiving the successively sent blocks of data at the target database, (iii) posting the successively sent blocks of data to the target database, and (iv) storing a total key range of the successively sent blocks of data;

(b) replicating data from the source database to the target database whenever changes are made to the source database, wherein replication occurs during the synchronizing step (a);

(c) determining if the row of data, or the stored total key range inclusive of the row of data, of any replication data received at the target database was previously posted to the target database in step (a)(iii); and (d) posting any replication data received at the target database if the row of data, or the stored total key range inclusive of the row of data, corresponding to the received data to be replicated has been previously posted to the target database in step (a)(iii), and not posting any replication data received at the target database if the row of data, or the stored total key range inclusive of the row of data, corresponding to the received data to be replicated has not been previously posted to the target database in step (a)(iii).

2. The method of claim 1 wherein the target database and the source database are both on-line during the synchronization.

3. The method of claim 1 wherein the successive blocks of data in step (a)(i) are sent to the target database from the source database without being processed by an audit trail or transaction log file.

4. The method of claim 1 wherein step (a)(i) further comprises sending the successive blocks of data in target database key order.

5. The method of claim 4 wherein the target database key order is target database primary key order.

6. The method of claim 1 wherein the source database is located at a first node of the system and the target database is located at a second node of the system.

7. A method of resynchronizing and replicating a target database with a source database in a database replication system, and the target and source databases were previously synchronized, the target database thereby being initially not empty, the method comprising:

(a) resynchronizing the target database with the source database, the source database being on-line during the resynchronization, wherein the resynchronizing includes:

(i) sending successive blocks of data from the source database to the target database, each block of data having a key range, each block of data including one or more rows of data, (ii) receiving the successively sent blocks of data at the target database, (iii) posting the successively sent blocks of data to the target database, and (iv) storing a total key range of the successivelysent blocks of data;

(b) replicating data from the source database to the target database whenever changes are made to the source database, wherein replication occurs during the resynchronizing step (a);

(c) determining if the row of data, or the stored total key range inclusive of the row of data, of any replication data received at the target database was previously posted to the target database in step (a)(iii); and (d) posting any replication data received at the target database if the row of data, or the stored total key range inclusive of the row of data, corresponding to the received data to be replicated has been previously posted to the target database in step (a)(iii), and not posting any replication data received at the target database if the row of data, or the stored total key range inclusive of the row of data, corresponding to the received data to be replicated has not been previously posted to the target database in step (a)(iii), wherein step (a)(iii) further comprises for each block of data sent from the source database, comparing the key range of each block of data sent from the source database with key ranges in the target database, and processing each block of data as follows:

(A) if a row in the block of data is not present in the target database based on the key range comparison, inserting the row and its content into the target database, (B) if a row in the block of data is present in the target database based on the key range comparison but has content that does not match the content of the row in the block of data, updating the target database row with the new content; and (C) if any rows are missing from the block of data but are present in the target database based on the key range comparison, then deleting such rows from the target database.

8. The method of claim 7 wherein the target database and the source database are both on-line during the resynchronization.

9. The method of claim 7 wherein the successive blocks of data in step (a)(i) are sent to the target database from the source database without being processed by an audit trail or transaction log file.

10. The method of claim 7 wherein step (a)(i) further comprises sending the successive blocks of data in target database key order.

11. The method of claim 10 wherein the target database key order is target database primary key order.

12. The method of claim 7 wherein the source database is located at a first node of the system and the target database is located at a second node of the system.

13. An article of manufacture for synchronizing a target database with a source database in a database replication system, the article of manufacture comprising a computer-readable medium encoded with computer-executable instructions for performing the steps of:

(a) executing instructions for synchronizing the target database with the source database, the source database being on-line during the synchronization, wherein the synchronizing includes:

(i) sending successive blocks of data from the source database to the target database, each block of data having a key range, each block of data including one or more rows of data, (ii) receiving the successively sent blocks of data at the target database, (iii) posting the successively sent blocks of data to the target database, and (iv) storing a total key range of the successively sent blocks of data;

(b) executing instructions for replicating data from the source database to the target database whenever changes are made to the source database, wherein replication occurs during the synchronizing step (a);

(c) executing instructions for determining if the row of data, or the stored total key range inclusive of the row of data, of any replication data received at the target database was previously posted to the target database in step (a)(iii); and (d) executing instructions for posting any replication data received at the target database if the row of data, or the stored total key range inclusive of the row of data, corresponding to the received data to be replicated has been previously posted to the target database in step (a)(iii), and not posting any replication data received at the target database if the row of data, or the stored total key range inclusive of the row of data, corresponding to the received data to be replicated has not been previously posted to the target database in step (a)(iii).

14. The article of manufacture of claim 13 wherein the target database and the source database are both on-line during the synchronization.

15. The article of manufacture of claim 13 wherein the successive blocks of data in step (a)(i) are sent to the target database from the source database without being processed by an audit trail or transaction log file.

16. The article of manufacture of claim 13 wherein step (a)(i) further comprises sending the successive blocks of data in target database key order.

17. The article of manufacture of claim 16 wherein the target database key order is target database primary key order.

18. The article of manufacture of claim 13 wherein the source database is located at a first node of the system and the target database is located at a second node of the system.

19. An article of manufacture for resynchronizing and replicating a target database with a source database in a database replication system, and the target and source databases were previously synchronized, the target database thereby being initially not empty, the article of manufacture comprising a computer-readable medium encoded with computer-executable instructions for performing the steps of:

(a) executing instructions for resynchronizing the target database with the source database, the source database being on-line during the resynchronization, wherein the resynchronizing includes:

(i) sending successive blocks of data from the source database to the target database, each block of data having a key range, each block of data including one or more rows of data, (ii) receiving the successively sent blocks of data at the target database, (iii) posting the successively sent blocks of data to the target database, and (iv) storing a total key range of the successively sent blocks of data;

(b) executing instructions for replicating data from the source database to the target database whenever changes are made to the source database, wherein replication occurs during the resynchronizing step (a);

(c) executing instructions for determining if the row of data, or the stored total key range inclusive of the row of data, of any replication data received at the target database was previously posted to the target database in step (a)(iii); and (d) executing instructions for posting any replication data received at the target database if the row of data, or the stored total key range inclusive of the row of data, corresponding to the received data to be replicated has been previously posted to the target database in step (a)(iii), and not posting any replication data received at the target database if the row of data, or the stored total key range inclusive of the row of data, corresponding to the received data to be replicated has not been previously posted to the target database in step (a)(iii), wherein step (a)(iii) further comprises for each block of data sent from the source database, comparing the key range of each block of data sent from the source database with key ranges in the target database, and processing each block of data as follows:
- (A) if a row in the block of data is not present in the target database based on the key range comparison, inserting the row and its content into the target database,
- (B) if a row in the block of data is present in the target database based on the key range comparison but has content that does not match the content of the row in the block of data, updating the target database row with the new content; and
- (C) if any rows are missing from the block of data but are present in the target database based on the key range comparison, then deleting such rows from the target database.

20. The article of manufacture of claim 19 wherein step (a)(i) further comprises sending the successive blocks of data in target database key order.

21. The article of manufacture of claim 20 wherein the target database key order is target database primary key order.

22. The article of manufacture of claim 19 wherein the source database is located at a first node of the system and the target database is located at a second node of the system.

23. An apparatus for synchronizing a target database with a source database in a database replication system, the apparatus comprising:

(a) means for synchronizing the target database with the source database, the source database being on-line during the synchronization, wherein the means for synchronizing includes:
- (i) means for sending successive blocks of data from the source database to the target database, each block of data having a key range, each block of data including one or more rows of data,
- (ii) means for receiving the successively sent blocks of data at the target database,
- (iii) means for posting the successively sent blocks of data to the target database, and
- (iv) means for storing a total key range of the successively sent blocks of data;

(b) means for replicating data from the source database to the target database whenever changes are made to the source database, wherein replication occurs during the synchronization;

(c) means for determining if the row of data, or the stored total key range inclusive of the row of data, of any replication data received at the target database was previously posted to the target database in step (a)(iii): and (d) means for posting any replication data received at the target database if the row of data, or the stored total key range inclusive of the row of data, corresponding to the received data to be replicated has been previously posted to the target database in step (a)(iii), the means for posting not posting any replication data received at the target database if the row of data, or the stored total key range inclusive of the row of data, corresponding to the received data to be replicated has not been previously posted to the target database in step (a)(iii).

24. The apparatus of claim 23 wherein the target database and the source database are both on-line during the synchronization.

25. The apparatus of claim 23 wherein the means for sending sends the successive blocks of data to the target database from the source database without being processed by an audit trail or transaction log file.

26. The apparatus of claim 23 wherein the means for sending sends the successive blocks of data in target database key order.

27. The apparatus of claim 26 wherein the target database key order is target database primary key order.

28. The apparatus of claim 23 wherein the source database is located at a first node of the system and the target database is located at a second node of the system.

* * * * *